(12) United States Patent
Ng et al.

(10) Patent No.: US 11,292,263 B2
(45) Date of Patent: Apr. 5, 2022

(54) INK CONTAINER

(71) Applicant: HEWLETT-PACKARD DEVELOPMENT COMPANY, L.P., Spring, TX (US)

(72) Inventors: Boon Bing Ng, Vancouver, WA (US); Michael W. Cumbie, Corvallis, OR (US); Yee Kiat Ng, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 578 days.

(21) Appl. No.: 16/316,287

(22) PCT Filed: Sep. 30, 2016

(86) PCT No.: PCT/US2016/054935
§ 371 (c)(1),
(2) Date: Jan. 8, 2019

(87) PCT Pub. No.: WO2018/063379
PCT Pub. Date: Apr. 5, 2018

(65) Prior Publication Data
US 2021/0283920 A1    Sep. 16, 2021

(51) Int. Cl.
*B41J 2/175* (2006.01)
(52) U.S. Cl.
CPC ....... *B41J 2/17566* (2013.01); *B41J 2/17526* (2013.01); *B41J 2002/17579* (2013.01)

(58) Field of Classification Search
CPC ............. B41J 2/17566; B41J 2/17526; B41J 2002/17579
See application file for complete search history.

(56) References Cited

U.S. PATENT DOCUMENTS

| | | | |
|---|---|---|---|
| 4,201,085 A | 5/1980 | Larson | |
| 5,182,545 A | 1/1993 | Goekler et al. | |
| 2005/0217369 A1 | 10/2005 | Holappa et al. | |
| 2009/0128591 A1* | 5/2009 | Knierim | B41J 2/17593 347/7 |
| 2013/0248525 A1* | 9/2013 | Kataoka | G01F 23/263 220/4.14 |

FOREIGN PATENT DOCUMENTS

| | | |
|---|---|---|
| CN | 202485752 U | 10/2012 |
| DE | 102006032602 A1 | 1/2008 |
| EP | 1602490 | 12/2005 |
| JP | H1034953 | 2/1998 |
| JP | 2010149528 | 7/2010 |

* cited by examiner

*Primary Examiner* — Jason S Uhlenhake
(74) *Attorney, Agent, or Firm* — Fabian VanCott

(57) ABSTRACT

Aspects relating to an ink container for an image reproduction device are described herein. The ink container includes a body and an electrical connection. The body is formed by molding a polymer material having a metal seed layer. The electrical connection is formed by metallizing a plurality of traces in the metal seed layer. The electrical connection extends from an inside wall of the ink container to an outer wall. A width of the electrical connection on the inside wall of the ink container gradually varies from a bottom of the ink container to a rim.

20 Claims, 9 Drawing Sheets

INK CONTAINER

BACKGROUND

Image reproduction devices, such as printers, scanners, and copiers, generally deliver small volumes of ink on to a substrate for printing on the substrate by a non-impact process. The devices usually include an ink container for storing ink for the device to use for printing. In few or all of such image production devices, there is a mechanism for determining a level of ink in the ink container, for example, to detect when the ink in the ink container has to be replenished.

BRIEF DESCRIPTION OF FIGURES

The detailed description is provided with reference to the accompanying figures. It should be noted that the description and the figures are merely examples of the present subject matter and are not meant to represent the subject matter itself.

DETAILED DESCRIPTION

Figure 1:
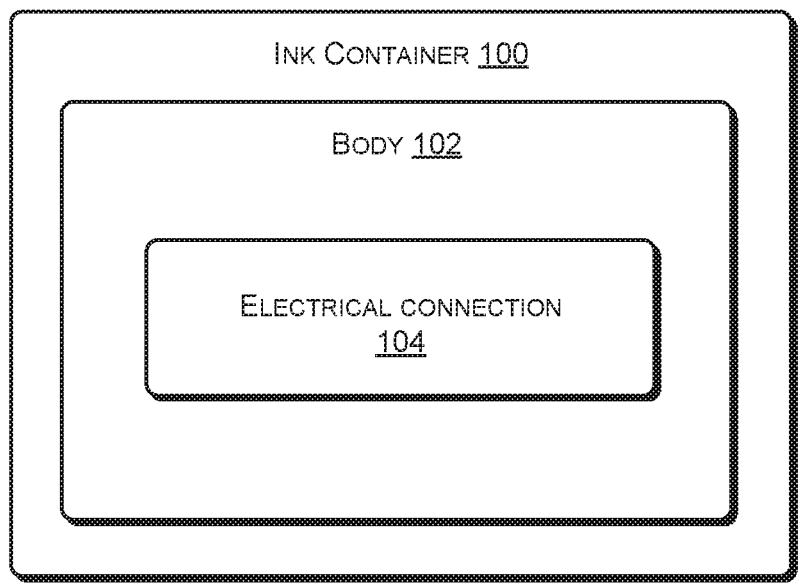
FIG. 1 illustrates a schematic of an ink container for an image reproduction device, according to an example.

Generally, an image reproduction device, such as a printer, has a provision for detecting level of ink in an ink container thereof. For example, the image reproduction device includes a sensor to determine the level of ink in the ink container. The sensor is, usually, provided on a printhead of the device, for instance, either in the printhead die or the printhead assembly, since all the electrical and electronic circuitry of the device is fabricated as part of the printhead. Such a sensor derives information regarding the level of ink in the ink container based on back pressure created in a passage carrying ink between the ink container and the printhead. For example, the back pressure can be indicative of a difference in flow rate of the ink in the passage, which in turn, can be indicative of the amount of ink in the ink container. However, the printhead may be subject to manufacturing variations, and therefore, one printhead may be structurally different from another. As a result, the same sensor when deployed in two different printheads may provide varying measurements of ink level. In order to standardize the measurements across various printheads, generally, complex software and firmware products have been developed. However, the development of such complex software and firmware products involves large investments in terms of time and capital, which can lead to a high development cycle time and cost of the products.

The present subject matter relates to a provision for determining level of ink in an ink container of an image reproduction device, such as a printer or a fax machine. Such a provision employs a direct interaction with the ink in the ink container to measure the level of ink by position sensing elements in the ink container. This allows for an accurate measure of the level of ink in the ink container. Accordingly, in one example, metallized traces are formed in the ink container to serve as an electrical connection to connect to external components, such as circuit elements and a control device. The ink container is made of a polymer having a metal seed layer, and the traces are formed and metallized in the metal seed layer. In an example, the metal seed layer is a metal additive provided along with the polymer, which can be used to form the metallic electrical connection in the body of the ink container. The electrical connection so formed extend from the inside of the ink container to the outside and, when connected to the external components, electricity flows through the ink.

According to an aspect, the width of the electrical connection on an inside wall of the ink container gradually varies from a bottom of the ink container to its rim. As a result, even when there is a small change in the level of ink in the ink container, there is a large change in an effective resistance offered by the ink to the flow of electricity therethrough. Therefore, the level of ink in the ink container or the change in the level of ink can be readily and accurately determined. Different circuit elements, such as a resistor, can be coupled between the electrical connection of the ink container and a control device to determine, in different ways, the level of ink in the ink container. For example, in one case, the electrical connection on the inside wall of the container can be covered with a dielectric material and the control device determines the change in capacitance to ascertain the level of ink.

As mentioned above, the present subject matter provides for an accurate measure of the level of ink, without allowing the manufacturing variations to affect the measurements. The accuracy of determining the ink level can assist in preventing low quality of printing and wastage of substrate as a consequence thereof.

The above aspects are further described in the figures and in associated description below. It should be noted that the description and figures merely illustrate principles of the present subject matter. Therefore, various arrangements that encompass the principles of the present subject matter, although not explicitly described or shown herein, can be devised from the description and are included within its scope. Additionally, the word "coupled" is used throughout for clarity of the description and can include either a direct connection or an indirect connection.

FIG. 1 illustrates a schematic of an ink container 100 for an image reproduction device, such as a printer, a scanner, a fax machine, or a copier. In the example illustrated in FIG. 1, the ink container 100 has a body 102 formed by molding a polymer material, the polymer material having a metal seed layer. The body 102 can form the cavity for holding ink. In addition, the ink container 100 can include an electrical connection 104 extending from an inside of the ink container 100 to an outside of the ink container 100. For example, the electrical connection 104 can extend from an inside wall to an external wall of the ink container 100. The electrical connection 104 can be formed by metallizing a plurality of traces in the metal seed layer of the polymer material. The electrical connection 104 can serve to connect the ink container to various components, such as a control device, for detecting the level of ink in the ink container 100. Although the present subject matter has been described with reference to the traces being metallized to form one electrical connection 104, the ink container 100 can have a plurality of electrical connections 104.

According to an aspect, a width of the electrical connection 104 running along the wall of the ink container 100 can gradually vary. In other words, from a bottom of the ink container 100 to its rim, the width of the electrical connection 104 on the inside wall of the ink container 100 gradually varies. As a result of such provision of the electrical connection 104, even with a minor change in the level of ink in the ink container, the effective resistance offered by the ink to the flow of electricity therethrough changes considerably.

Figure 2A:
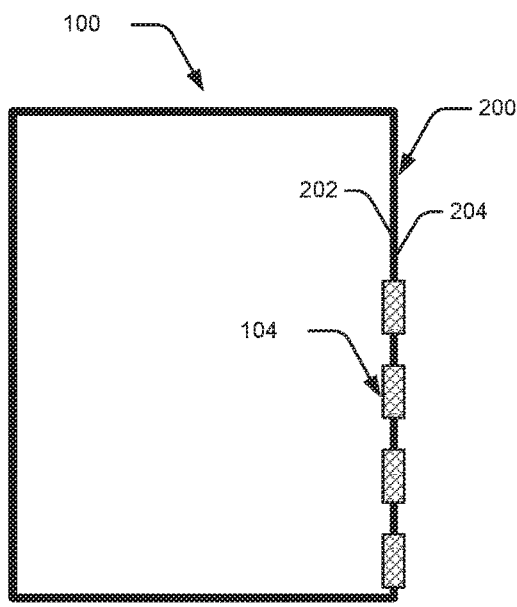
FIGS. 2A, 2B, 2C, and 2D illustrate examples of the ink container.
Figure 2B:
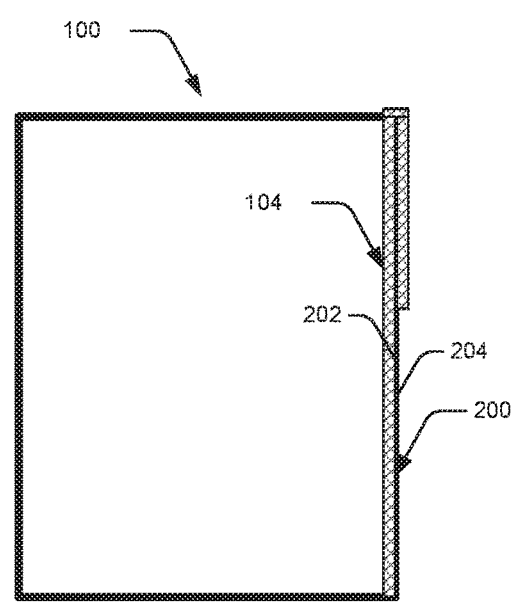

In an example, the ink container 100 can be manufactured using a laser direct structuring process. In such an example, the body 102 of the ink container 100 is injection molded using a polymer compounded with a metal additive, the metal additive forming the metal seed layer. The metal additive can be laser activated to form the plurality of traces, and after laser activation, the traces can be electroplated to form the electrical connection 104. In one case, the body 102 can be patterned using a catalyst laser. After laser patterning, the metal additives are activated and, thereafter, electroplated. FIGS. 2A, 2B, and 2O illustrate different examples of the ink container 100, in accordance with the present subject matter.

FIG. 2A illustrates a cross-sectional view of the ink container 100, according to one example. As shown in FIG. 2A, the electrical connection 104 of the ink container 100 can extend through the wall 200 of the ink container 100. In other words, the electrical connection 104 extends from the inside wall 202 to the outside wall 204 of the ink container 100 across the thickness of the wall 200. Further, in an instance, the electrical connection 104 can be formed as intermittent strips in the wall 200 and the intermittent strips can collectively function as the electrical connection 104. This may assist in saving manufacturing time and resources, without any material effect on the operability of the electrical connection 104 for the purpose of determining the level of ink in the ink container 100.

FIG. 2B illustrates a cross-sectional view of the ink container 100, according to another example. In said example, the electrical connection 104 can be formed along the surface of the body 102 of the ink container 100. For instance, the electrical connection 104 can be formed as continuous track along the surface of the body 102, extending from the inside wall 202 to the outer wall 204 of the ink container 100. In another case, the electrical connection 104 can be formed as an intermittent track along the surface of the body 102, i.e., along the wall 200, extending from a bottom of the inside wall 202 to the outer wall 204.

Figure 2C:
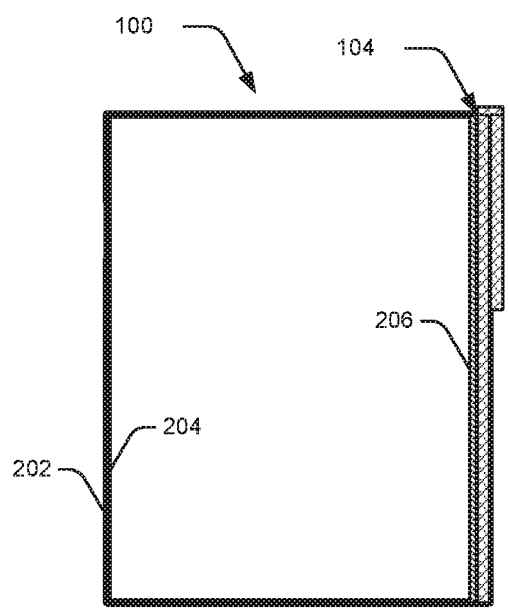

FIG. 2C illustrates a cross-sectional view of the ink container 100, according to yet another example of the present subject matter. In said example, the electrical connection 104 facing a cavity of the ink container 100, i.e., the portion of the electrical connection 104 on the inside wall 202 of the ink container 100, is coated with a dielectric material 206. For instance, the electrical connection 104 can be formed through the wall 200, as in the example of FIG. 2A or along the surface of the wall 200, as in the example of FIG. 2B. Further, the electrical connection 104 can be formed as intermittently extending, as explained above. In such a case, the dielectric material 206 can be coated over the electrical connection 104 such that when the ink container 100 is filled with ink, the ink does not come in direct contact with the electrical connection 104.

Figure 2D:
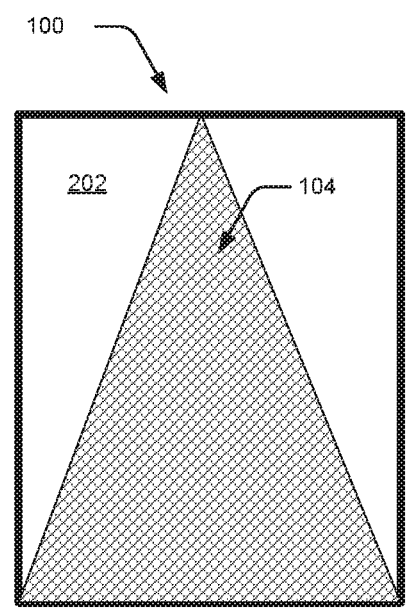

As mentioned previously, the width of the electrical connection 104 along a height of the ink container 100 can gradually vary. FIG. 2D illustrates a front view of an inside wall 202 of the ink container, according to an example, to illustrate the variation of the width of the electrical connection 104. As shown in FIG. 2D, the electrical connection 104 tapers along its length, i.e., along the height of the ink container 100. As a result, the shape of the electrical connection 104 can be either triangular or can be in the form of a trapezium or a trapezoid. Though shown as tapering in the present example, the electrical connection 104 can take any shape which is varying in width along the height or width of the ink container 100.

In operation, such a variation of the width of the electrical connection 104 can facilitate in a greater change in the effective resistance of the ink with a minor change in the level of the ink in the ink container 100. This is so because as the level of ink in the ink container 100 changes, an area of the electrical connection 104 that is in contact with the ink also varies. Such a variation in the area of contact, in turn, causes a greater variation in the effective resistance measured across two terminals provided across the ink in the ink container 100.

The employment of the ink container 100 for the purpose of determining the level of ink therein is explained in detail with reference to FIGS. 3, 4A, 4B, 5A, 5B, 6A, 6B, and 7.

Figure 3:
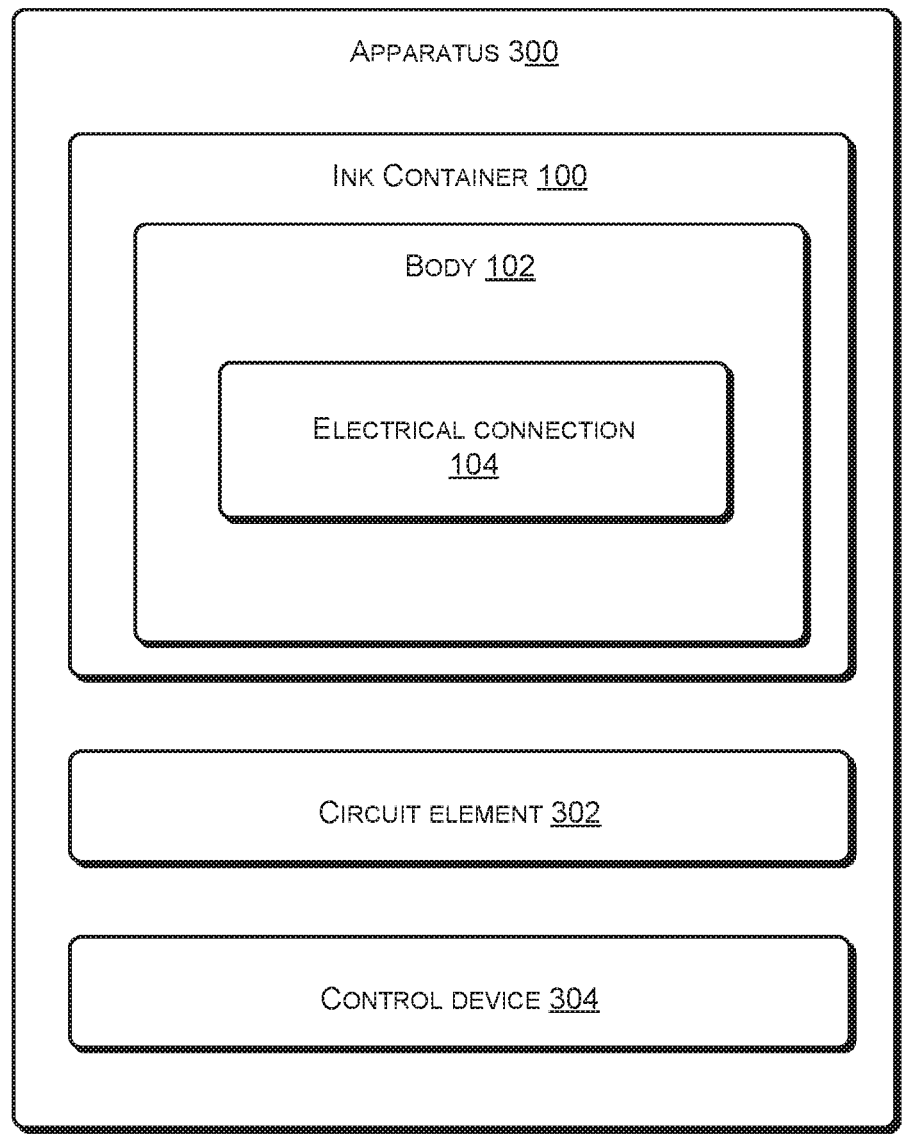
FIG. 3 illustrates a schematic of an apparatus for determining level of ink in the ink container, according to an example.

FIG. 3 illustrates a schematic of an apparatus 300 for determining level of ink in the ink container 100 of the image reproduction device. The apparatus 300 includes the ink container 100, as explained above, having the body 102 and the electrical connection 104 formed by metallizing the traces in the metal seed layer in the body 102. The electrical connection 104 can be connected to other components and serve to determine the ink level in the ink container 100. As explained previously, the electrical connection 104 extends from the inside wall 202 to the outside wall 204 of the ink container, and the width of the electrical connection 104 on the inside wall 202 gradually varies from the bottom to the rim.

In addition, the apparatus 300 includes a circuit element 302 and a control device 304. The circuit element 302 is connected at one terminal to the electrical connection 104 of the ink container 100, and, at the other terminal, to the control device 304. In other words, the circuit element 302 is connected between the ink container 100, i.e., the electrical connection 104 of the ink container 100, and the control device 304. In operation, the control device 304 can determine a condition associated with the circuit element 302 to ascertain the level of ink in the ink container 100. For example, the condition can be an impedance across the circuit element 302 or an effective resistance across the terminals of the circuit element 302.

In an example, the control device 304 may be a microprocessor, a microcomputer, a microcontroller, a digital signal processor, a central processing unit, a state machine, a logic circuitry, and/or any other device that can manipulate signals and data based on computer-readable instructions. For example, the control device 304 can determine a resistance, an impedance, or a capacitance value across the terminals of the circuit element 302, which is, in turn, indicative of the level of ink in the ink container 100. Accordingly, different types of circuit elements 302, settings, and conditions across the circuit element 302 can be used in the apparatus 300 to detect the level of ink in the ink container 100. For example, the electrical connection 104 can be formed as a serpentine structure to attain an appropriate resistance value for use in determining the ink level in the ink container 100. FIGS. 4A to 7 are described below to discuss examples of such different settings of the apparatus 300 for determining the ink level.

Figure 4A:
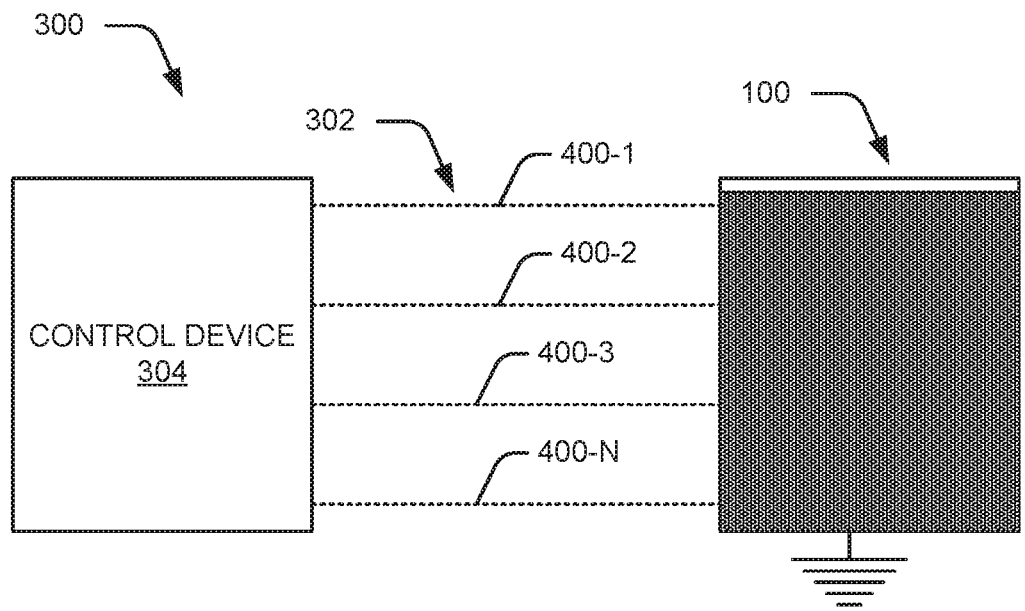
FIGS. 4A and 4B illustrate an example of the apparatus for determining the level of ink in the ink container.
Figure 4B:
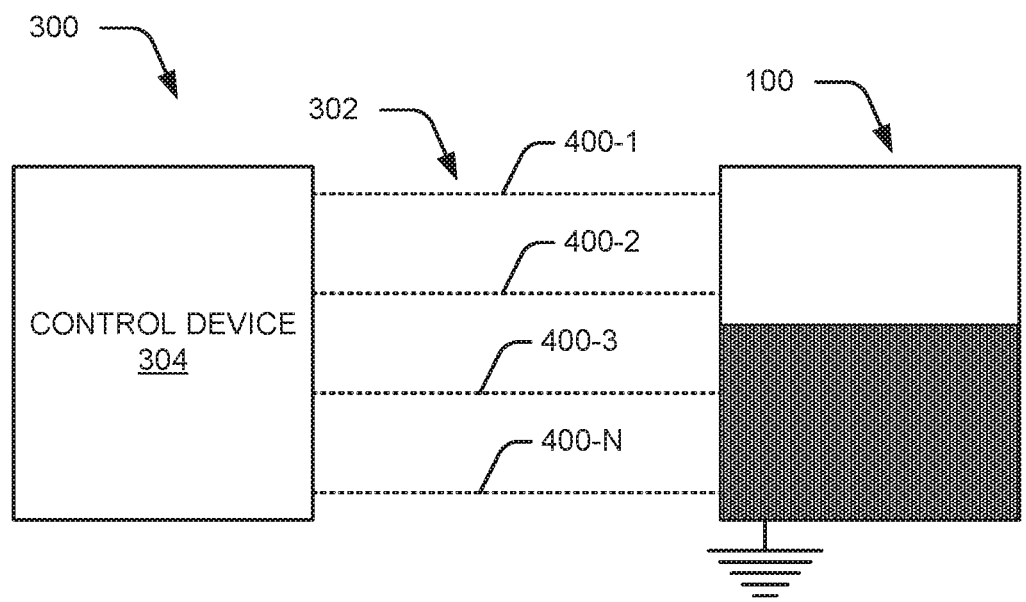

FIGS. 4A and 4B illustrate, according to an example of the present subject matter, the apparatus 300 for determining the level of ink in the ink container 100. While FIG. 4A shows the condition when the level of ink in the ink container 100 is 100%, FIG. 4B illustrates the condition when the level of ink in the ink container 100 is about 50%. For the sake of brevity and ease of understanding, FIG. 4A and FIG. 4B are described in conjunction. In the present example, the apparatus 300 employs an assembly of parallel connections 400-1, 400-2, . . . 400-N, collectively referred to as parallel connections 400 and individually referred to as a parallel connection 400. In other words, the assembly of parallel connections 400 is employed as the circuit element 302 in the apparatus 300 in the present example. For instance, the number of parallel connections 400 to be deployed can be selected based on the granularity with which the change in the level of ink in the ink container 100 is to be determined.

The parallel connections 400 are each individually connected, at one terminal, to the electrical connection 104 running along the wall 200 of the ink container 100 from the bottom to the rim. The electrical connection 104 is also connected to ground, i.e., is at ground voltage. The other terminal of each of the parallel connections 400 is individually connected to the control device 304. In the present example, the control device 304 can determine the level of ink in the ink container 100 based on an impedance across the terminals of each of the parallel connections 400.

In operation, as shown in FIG. 4A, when level of ink is at 100% in the ink container 100, all the parallel connections 400 coupled between the ink container 100 and the control device 304 are connected or "shorted" to the ground through the ink and the electrical connection 104 of the ink container. Therefore, in this case, when the control device 304 measures the impedance across the terminals of each of the parallel connections 400, and the impedance is determined to be negligible, which indicates that all the parallel connections are shorted, indicating that the level of ink is up to the level of the topmost parallel connection 400, i.e., substantially at 100%.

Further, as shown in FIG. 4B, when the level of ink drops to about 50% of the ink container 100, the level of ink is below few of the parallel connections 400. Accordingly, such few parallel connections 400, such as parallel connections 400-1 and 400-2, form open circuits, while the rest of the parallel connections 400 are still connected to ground voltage through the ink and the ink container 100. Accordingly, when the control device 304 determines the impedance across the terminals of the parallel connections 400, the parallel connections 400, which are in open circuit, are determined to have very high impedance, for example, infinitely high impedance. Accordingly, at each level that the parallel connections 400 are coupled along a height of the ink container 100, the control device 304 can determine which parallel connections 400 are open circuit and which are short, and accordingly, can ascertain, with considerable amount of accuracy, the level of ink in the ink container 100. In addition, the distinctiveness of the signal between the open circuit and the short circuit parallel connections allows that the apparatus 300 has a low signal to noise ratio.

Figure 5A:
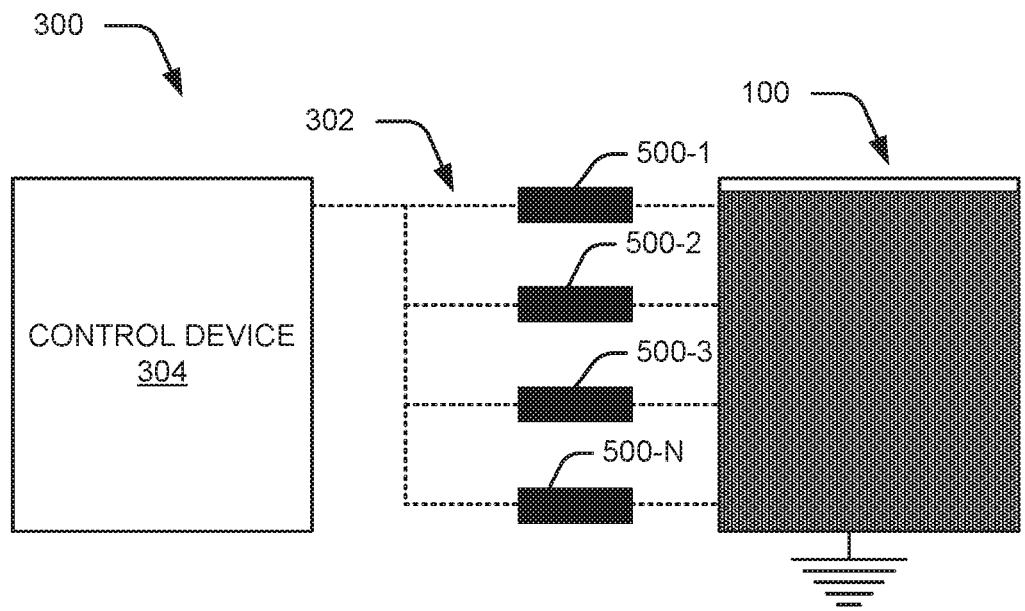
FIGS. 5A and 5B illustrate another example of the apparatus for determining the level of ink in the ink container.
Figure 5B:
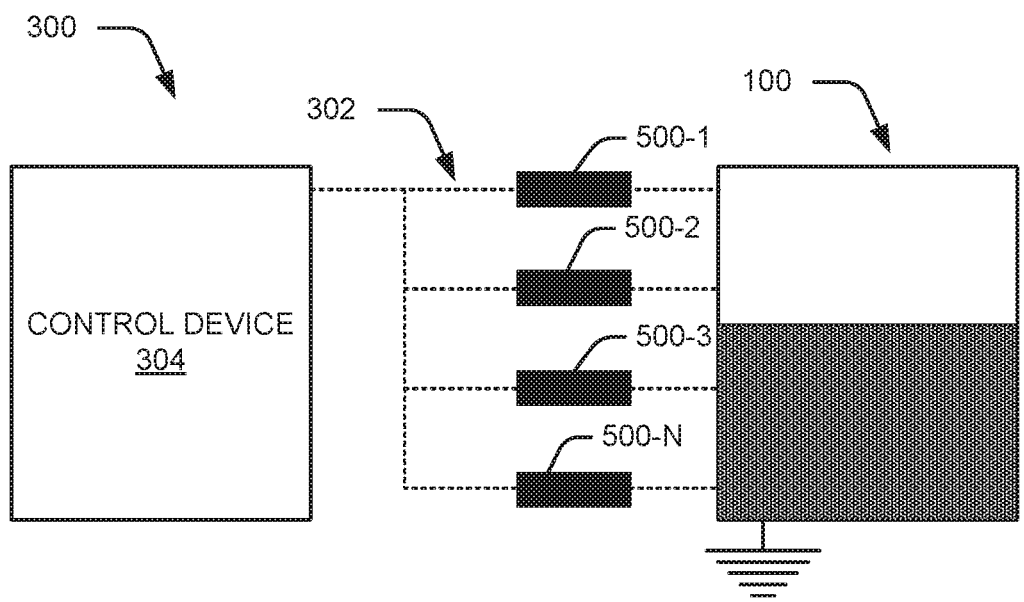

FIGS. 5A and 5B illustrate the apparatus 300 for determining the level of ink in the ink container 100, according to another example of the present subject matter. FIG. 5A shows the condition when the level of ink in the ink container 100 is 100% and FIG. 4B illustrates the condition when the level of ink in the ink container 100 is about 50%. For the sake of brevity and ease of understanding, FIG. 5A and FIG. 5B are described in conjunction. In the present example, in the apparatus 300, an assembly of parallel-connected resistors can be employed as the circuit element 302 and the control device 304 can ascertain an effective resistance across the terminals of the circuit element 302 to determine the level of ink in the ink container 100. For example, the apparatus 300 can include an assembly of parallel-connected resistors 500-1, 500-2, . . . 500-N, collectively referred to as parallel-connected resistors 500 and individually referred to as a parallel-connected resistor 500. As explained earlier, the number of parallel-connected resistors 500 to be used in the apparatus 300 can be selected based on the resolution with which the change in the level of ink in the ink container 100 is to be determined.

The parallel-connected resistors 500 can each be individually connected, at one terminal, to the electrical connection 104 running along the height of the wall 200 of the ink container 100. The electrical connection 104 of the ink container 100 is also connected to ground, i.e., is at ground voltage. The other terminal of each of the parallel-connected resistors 500 is individually connected to the control device 304. As mentioned, in the present example, the control device 304 can determine the level of ink in the ink container 100 based on an effective resistance or an equivalent resistance across the terminals of the assembly of the parallel-connected resistors 500 acting as the circuit element 302.

In one example, a resistor having the lowest resistance can be connected closest to the top or the rim of the ink container 100, and a resistor having the largest resistance can be connected closest to the bottom of the ink container, and the resistors can be connected in serially increasing order of resistance from the bottom to the top of the ink container 100. For instance, in case the circuit element 302, i.e., the assembly of parallel-connected resistors 500, includes four resistors having resistances of 10,000 Ohm, 1000 Ohm, 100 Ohm and 10 Ohm, then the resistor having 10 Ohm resistance can be connected closest to the rim of the ink container 100, followed by the resistor having 100 Ohm resistance below, followed by the resistor having 1000 Ohm resistance, and followed by the resistor having 10,000 Ohm resistance closest to the bottom of the ink container 100. In another example, however, all the resistors in the assembly of the parallel-connected resistors 500 can have equal resistance. In such a case, as explained above, with a change in the level of ink, the resistor(s) which are not connected through the ink will be in open circuit and those connected through the ink will be shorted, and the equivalent resistance will represent ink level.

In operation, as shown in FIG. 5A, when level of ink is at 100% in the ink container 100, all the parallel-connected resistors 500 starting from the one closest to the rim to the one closest to the bottom, are all connected to the ground through the ink and the electrical connection 104 of the ink container. Therefore, in this condition, all resistors in the assembly are connected in parallel, and the control device 304 can determine the equivalent or effective resistance across the terminals of assembly of the parallel-connected resistors 500. For example, in the above case where the assembly includes the mentioned four resistors, when the resistors are connected in parallel, the control device 304 determines the equivalent resistance to be 9 Ohm. The control device 304 can determine the effective resistance based on the following relation:

$$\frac{1}{Re} = \frac{1}{R1} + \frac{1}{R2} + \cdots \frac{1}{RN} \qquad (1)$$

In the above relation (1), Re is the effective resistance and R1, R2, ... RN are the respective resistances of the resistors connected in parallel.

Accordingly, as shown in FIG. 4B, when the level of ink is about 50% of the ink container 100, the level of ink is below few of resistors in the assembly of parallel-connected resistors 500. This means that few of the resistors in the assembly form open circuits, while the rest of the resistors are still connected to ground voltage through the ink and the ink container 100 and, therefore, form closed circuits. Accordingly, when the control device 304 determines the effective resistance across the terminals of the assembly of parallel-connected resistors 500, the control device 304 can ascertain, from the effective resistance, the level of ink in the ink container 100.

For instance, again taking the above example of four resistors, when the level of ink drops to about 50% of the ink container 100, the top two resistors having 10 Ohm resistance and 100 Ohm resistance are part of the open circuit, whereas the bottom two resistors having 1000 Ohm resistance and 10,000 Ohm resistance are part of the closed circuit. Accordingly, in such a condition, the control device 304 can determine the effective resistance across the terminals of the assembly of the parallel-connected resistors 500 to be 900 Ohm, based on the above relation (1). Accordingly, at different levels, the control device 304 can determine, based on the resistors part of open circuit and closed circuit, the effective resistance across the terminals of the assembly of the parallel-connected resistors 500, which indicates the level of ink in the ink container 100.

Figure 6A:
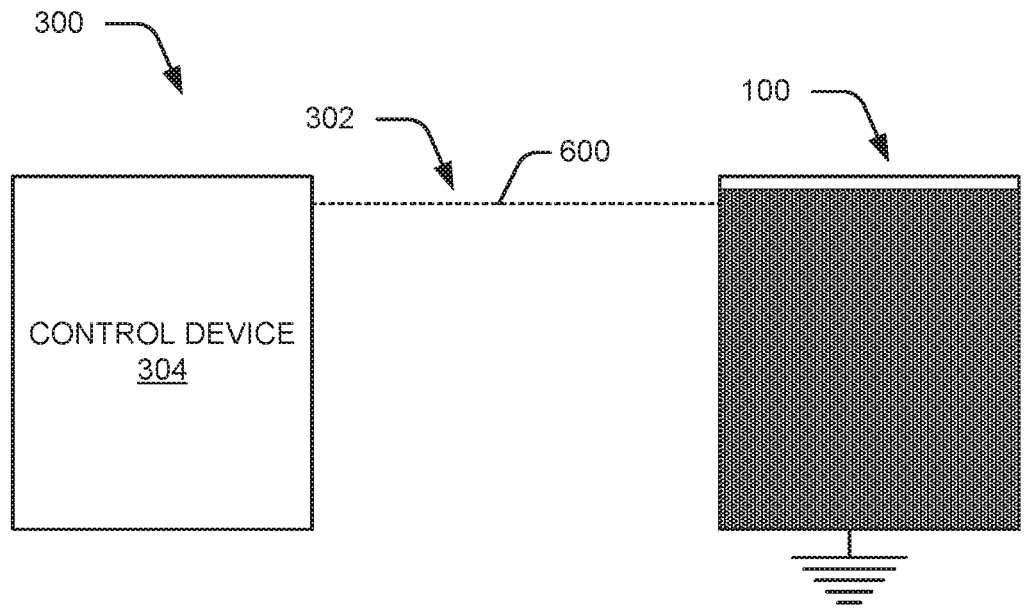
FIGS. 6A and 6B illustrate yet another example of the apparatus for determining the level of ink in the ink container.
Figure 6B:
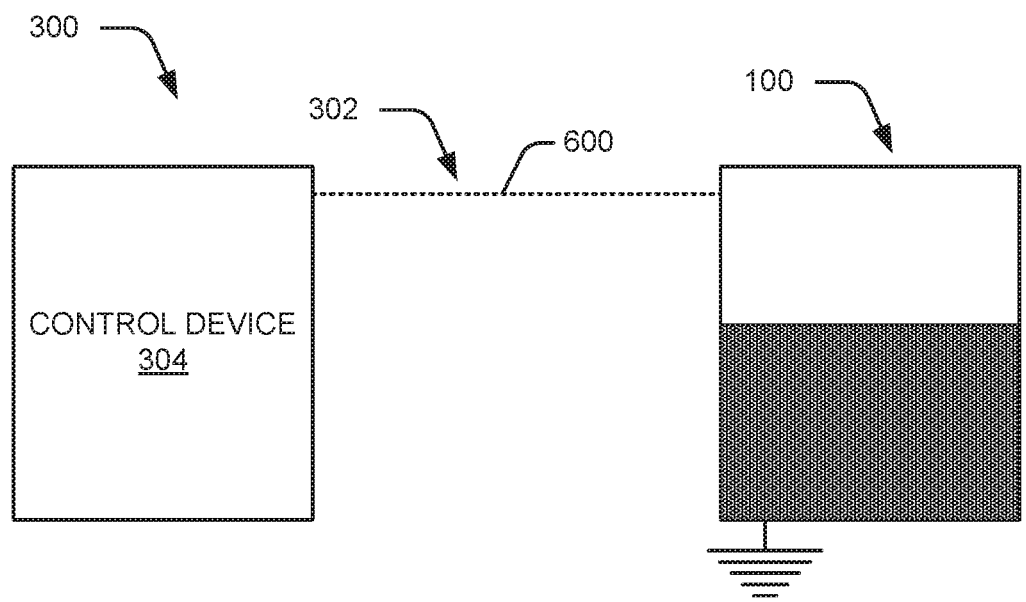

Further, FIGS. 6A and 6B illustrate the apparatus 300 for determining the level of ink in the ink container 100, according to yet another example of the present subject matter. FIG. 6A shows the condition when the level of ink in the ink container 100 is 100% and FIG. 6B illustrates the condition when the level of ink in the ink container 100 is about 50%. For the sake of brevity and ease of understanding, FIG. 6A and FIG. 6B are described in conjunction.

In the present example, the control device 304 can ascertain a change in effective resistance of the ink in terms of the capacitance across the terminals of the circuit element 302 to determine the level of ink in the ink container 100. The electrical connection 104 of the ink container 100 is also connected to ground. In addition, in said example, the apparatus 300 employs the ink container 100 which has the portion of the electrical connection 104 on the inside wall 202 coated with a dielectric material 206.

However, although the above example is explained with reference to the apparatus 300 which employs an ink container 100 having the dielectric material 206 coated on the electrical connection 104, the apparatus 300 may employ the ink container 100 without the dielectric material 206, and having any of the previously discussed designs, and the control device 304 can detect the ink level in said ink container 100 also. In addition, as explained previously, having varying width of the electrical connections 104 in the inside wall 202 of the ink container 100 allow that a small change in the level of ink in the ink container 100 causes a large change in an effective resistance, i.e., capacitance in the present case, offered by the ink to the flow of electricity therethrough. As a result, the ease and accuracy of detecting the level of ink is high.

Further, in said example, the apparatus 300 can use a simple connector 600, such as a wire, as the circuit element 302. The connector 600 can be connected, at one terminal, to the electrical connection 104 running along the height of the wall 200 of the ink container 100, and at the other terminal, to the control device 304.

In operation, for instance, the control device 304 can determine the change in capacitance of the ink, based on the overlap between the electrical connection 104 and the ink. In said example, the control device 304 can determine the capacitance of the ink based on the following relation:

$$C = EA/D \qquad (2)$$

In the above relation (2), C stands for the capacitance, E stands for a constant, electric field intensity. Further, A indicates an overlapping area between the electrical connection 104 and the ink. The overlapping area can be the area of contact between the ink and the electrical connection 104. In case the ink and the electrical connection 104 are separated by the dielectric material 206, the overlapping area can be the area of contact between the ink and the dielectric material. D indicates another constant, a distance between the ink and the electrical connection 104, for example, the thickness of the dielectric material 206. As the level of ink in the ink container 100 lowers, the overlapping area between the ink and the electrical connection 104 reduces and, as a result, the capacitance, due to the ink, will also reduce. Accordingly, the control device 304 can measure the capacitance across the terminals of the connector 600 to detect the level of ink in the ink container 100.

For instance, as shown in FIG. 6A, when level of ink is at 100% in the ink container 100, the overlapping area between the ink and the electrical connection 104 is high. In such a condition, the control device 304 can detect that the capacitance across the terminals of the connector 600 is considerably high, indicating high level of ink in the ink container 100. When the level of ink is about 50%, as shown in FIG. 6B, the overlapping area between the ink and the electrical connection reduces to about half of the overlapping area in the initial condition discussed above. As a result, the control device 304 can detect a change of about 2 times in the capacitance value of the ink to detect that the level of ink is down to half.

Figure 7:
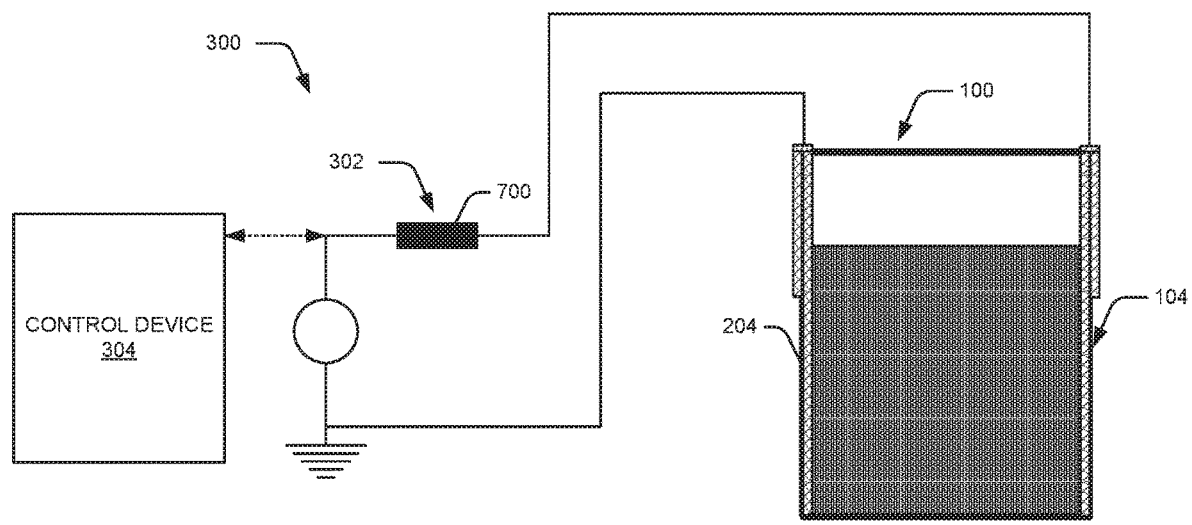
FIG. 7 illustrates one other example of the apparatus for determining the level of ink in the ink container.

Further, FIG. 7 illustrates the apparatus 300 for determining the level of ink in the ink container 100, according to one other example of the present subject matter. In said example, the control device 304 can determine an effective resistance of the ink in the ink container 100 to determine the level of ink therein. For instance, the apparatus 300 so employed for determining the effective resistance of the ink in the ink container 100 works on the same principle as a potentiometer, where a change in the resistance causes a voltage drop across terminals of a known circuit element. Accordingly, in the apparatus 300, a change in the voltage across terminals can be indicative of the change in resistance of the ink, based on the level of ink, and therefore, can be used to detect the level of ink in the ink container 100. In addition, as explained previously, having varying width of the electrical connections 104 in the inside wall 202 of the ink container 100 allow that a small change in the level of ink in the ink container causes a large change in an effective resistance offered by the ink to the flow of electricity therethrough. As a result, the ease and accuracy of detecting the level of ink is high.

In an example, the apparatus 300 can employ a resistor 700 as the circuit element 302. The resistor 700 can have one of the terminal coupled to the electrical connection 104, for example, on the outside wall 204 of the ink container 100, and the other terminal coupled to the control device 304. The control device 304 can, during operation, determine the voltage drop across the resistor 700 to detect the level of ink in the ink container 100. For example, the effective resistance of the ink is low when the level of ink is high and increases with the decrease in the level of ink. For instance, the control device 304 can detect the voltage drop, and therefore, the change in the level of ink or the level of ink, based on the following relation:

$$V\text{sense}=V\text{in}*(R\text{ink}/(R\text{ink}+R1)) \tag{3}$$

In the above relation (3), Vsense indicates the voltage drop being measured across the terminals of the resistor 700, i.e., the circuit element, Vin is the input voltage, R1 is the resistance of resistor 700, and Rink is the effective resistance of the ink. As can be seen from the above relation, Vsense is dependent on Rink, which means that a change in the voltage across the terminals of resistor 700 indicates a change in the effective resistance of the ink in the ink container 100.

Figure 8:
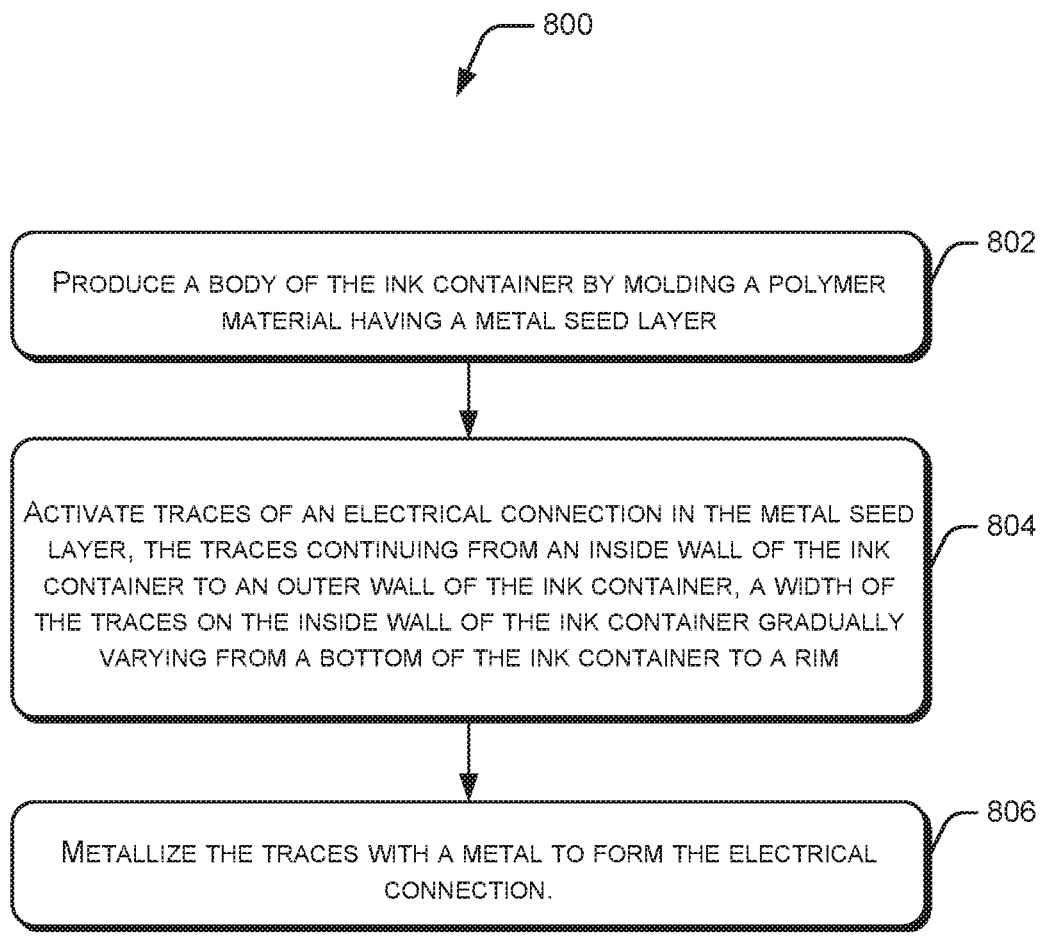
FIG. 8 illustrates a method for manufacturing an ink container for an image reproduction device, according to an example.

Method 800 is described in FIG. 8 for manufacturing an ink container 100 for an image reproduction device, according to an example of the present subject matter, which can be used for determining the level of ink in the manner as described previously. The order in which the method 800 is described is not intended to be construed as a limitation, and any number of the described method blocks can be combined in any appropriate order to carry out the method 800 or an alternative method. Additionally, individual blocks may be deleted from the method 800 without departing from the spirit and scope of the subject matter described herein.

Referring to FIG. 8, at block 802, a body 102 of the ink container 100 can be produced by molding a polymer material having a metal seed layer. In an example, the body 102 of the ink container 100 can be injection molded using a polymer compounded with a metal additive, the metal additive forming the metal seed layer.

At block 804, traces of an electrical connection are activated in the metal seed layer, the traces continuing from an inside wall 202 forming a cavity of the ink container 100 to an outer wall 204 of the ink container 100. According to an aspect, a width of the traces on the inside wall 202 of the ink container 100 gradually varies from a bottom of the ink container 100 to a rim. In an example, the traces can be activated by laser activation of the metal additives in the metal seed layer. For instance, the traces can be activated by a catalyst laser.

At block 806, the traces are metallized with a metal to form the electrical connection. In an example, the traces can be metallized by plating with a metal. For instance, the metal used for plating can include gold, palladium, nickel, copper, or combination thereof.

Although aspects of the ink container 100 and those for determining level of ink in the ink container 100 have been described in language specific to structural features and/or methods, it is to be understood that the appended claims are not limited to the specific features or methods described. Rather, the specific features and methods are disclosed as examples for ink container 100 and aspects for determining level of ink in the ink container 100.

What is claimed is:

1. An ink container for an image reproduction device, the ink container comprising:

a body formed by molding a polymer material having a metal seed layer; and an electrical connection formed by metallizing a plurality of traces in the metal seed layer, the electrical connection extending from an inside wall of the ink container to an outer wall of the ink container, wherein a width of the electrical connection on the inside wall of the ink container gradually varies from a bottom of the ink container to a rim.

2. The ink container as claimed in claim 1, wherein the electrical connection is formed across a thickness of the wall of the ink container to provide an electrical path from inside to outside of the wall.

3. The ink container as claimed in claim 2, wherein the electrical connection is formed as intermittent strips arranged in a line vertically along a height of the ink container.

4. The ink container as claimed in claim 1, wherein the electrical connection is formed as a continuous track on a surface of the body extending from a bottom of the inside wall to the outer wall of the ink container.

5. The ink container as claimed in claim 1, wherein the electrical connection on the inside wall of the ink container is coated with a dielectric material.

6. The ink container as claimed in claim 1, wherein the width of the electrical connection gradually decreases from the bottom of the ink container to the rim of the ink container.

7. The ink container as claimed in claim 1, wherein the metal seed layer comprises a metal additive to the polymer material.

8. The ink container as claimed in claim 1, further comprising a control device to detect a change in voltage across different traces of the plurality of traces, the control device registering the change in voltage as indicative of a change in resistance of ink in the ink container which is further indicative of a level of the ink.

9. The ink container as claimed in claim 8, further comprising a resistor connected between the control device and one of the traces.

10. The method as claimed in claim 1, wherein activating traces of the electrical connection comprises:

applying a catalyst laser to the metal seed layer where the traces are to be; and electroplating the resulting traces.

11. An apparatus for determining level of ink in an ink container of an image reproduction device, the apparatus comprising:

the ink container comprising, a body formed by molding a polymer material having a metal seed layer, the body forming a cavity for holding ink; and an electrical connection formed by metallizing a plurality of traces in the metal seed layer, the electrical connection extending from an inside wall of the ink container to an outer wall of the ink container, wherein a width of the electrical connection on the inside wall of the ink container gradually varies from a bottom of the ink container to a rim of the ink container;

a circuit element connected at one terminal to the electrical connection of the ink container; and a control device connected to another end of the circuit element, wherein the control device is to determine a condition associated with the circuit element to determine the level of ink in the ink container.

12. The apparatus as claimed in claim 11, wherein the control device is to ascertain an effective resistance of the ink in the ink container to determine the level of ink in the ink container.

13. The apparatus as claimed in claim 11, wherein the circuit element comprises an assembly of parallel-connected resistors, and the control device is to ascertain an effective resistance across the terminals of the circuit element to determine the level of ink in the ink container.

14. The apparatus as claimed in claim 13, wherein the assembly of parallel-connected resistors comprises a resistor having a lowest resistance located closest to a top or rim of the ink container and a resistor having a largest resistance located closest to a bottom of the ink container.

15. The apparatus as claimed in claim 11, wherein the circuit element comprises an assembly of parallel connections, and the control device is to ascertain an impedance across each of the terminals to determine the level of ink in the ink container.

16. The apparatus as claimed in claim 11, wherein the electrical connection facing a cavity of the ink container is coated with a dielectric material; and
wherein the control device is to ascertain a change in capacitance across the terminals of the circuit element to determine the level of ink in the ink container.

17. A method for manufacturing an ink container for an image reproduction device, the method comprising:
producing a body of the ink container by molding a polymer material having a metal seed layer;
activating traces of an electrical connection in the metal seed layer, the traces continuing from an inside wall forming a cavity of the ink container to an outer wall of the ink container, wherein a width of the traces on the inside wall of the ink container gradually varies from a bottom of the ink container to a rim; and
metallizing the traces with a metal to form the electrical connection.

18. The method as claimed in claim 17, wherein the electrical connection is formed across a thickness of the wall of the ink container.

19. The method as claimed in claim 17, wherein the electrical connection is formed as a continuous track on a surface of the body extending from a bottom of the inside wall to the outer wall of the ink container.

20. The method as claimed in claim 17, wherein the electrical connection facing the cavity of the ink container is coated with a dielectric material.

* * * * *